W. ADAMSON,

Assignor to J. P., E. P. & D. BAUGH.

Method of Treating Offal.

No. 8,742. Reissued June 10, 1879.

Witnesses.
John McDermer
Thos. McIlvaine

Inventors
J. P. Baugh
Edwin P. Baugh and
Daniel Baugh
by their attorneys
Howson and Son

N. PETERS, PHOTO-LITHOGRAPHER, WASHINGTON, D. C.

UNITED STATES PATENT OFFICE.

JOHN P. BAUGH, EDWIN P. BAUGH, AND DANIEL BAUGH, OF PHILADELPHIA, PENNSYLVANIA, ASSIGNEES OF WILLIAM ADAMSON.

IMPROVEMENT IN METHODS OF TREATING OFFAL.

Specification forming part of Letters Patent No. 46,318, dated February 14, 1865; Reissue No. 2,114, dated November 28, 1865; Reissue No. 8,742, dated June 10, 1879; application filed October 7, 1878.

DIVISION B.

*To all whom it may concern:*

Be it known that certain reissued Letters Patent, No. 2,114, for the treatment of offal were granted to us, JOHN P. BAUGH, EDWIN P. BAUGH, and DANIEL BAUGH, (trading under the firm-name of BAUGH & SONS,) of Philadelphia, Pennsylvania, as the assignees of WILLIAM ADAMSON, of the same place, on the 28th day of November, 1865, the original patent bearing date the 14th day of February, 1865; and we do hereby declare the following to be a full, clear, and exact description of that part of the said invention which relates to a new manure or manure ingredient, the product of animal offal submitted to a process of artificial drying.

In Chicago and other western cities, where vast quantities of hogs and other cattle are slaughtered, the proper disposal of the offal became a subject of much consideration. It was originally the practice to throw this offal into the rivers and creeks, to the annoyance of those living in the neighborhood, and to the detriment of the public health. Subsequently attempts were made to utilize the offal by converting it into a fertilizer, the offal being placed in heaps on the ground, where it was permitted to ferment, after which it was spread out and dried by exposure to the air. This proved to be more or less impracticable, owing to the retention by the offal of fluid matter, which caused rapid fermentation and the exhalation of offensive and deleterious gases.

The said ADAMSON discovered that the animal offal could, by a proper system of draining and artificial drying, be converted into an available manure or manure ingredient, and it has been ascertained that this manure is much richer than that made of animal offal which has first been allowed to ferment, and then to be dried by simple exposure to the air.

The accompanying drawings show the structure in which this rich manure may be obtained by the treatment of animal offal.

Figure 5:
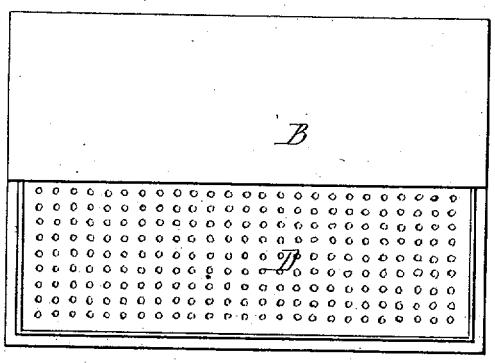
Figure 1:
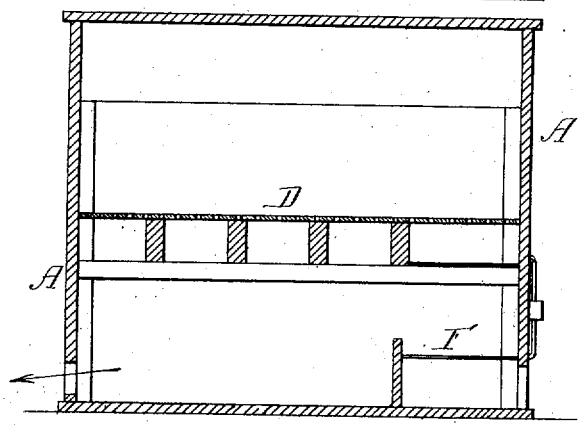
Figure 2:
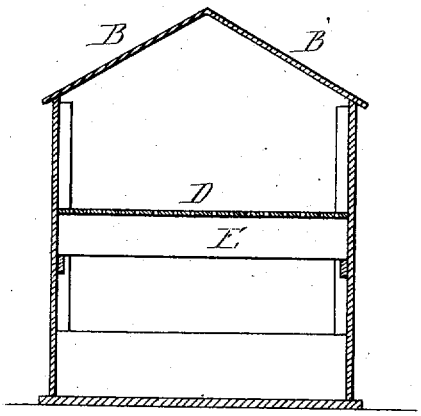

Figure 1 of the drawings represents a vertical section of the building; Fig. 2, a transverse section; Fig. 3, a plan view, and Fig. 4 a modified form of structure.

The building A may be either of brick, wood, or other suitable material, should be about twice as long as it is broad, and should have the usual inclined roof B, part of which is detachable for the introduction of the offal, which is deposited on a draining floor or platform, D, consisting of perforated plates, wire-netting, or grating supported by suitable joists E. Beneath the floor, and at one end of the building, is a fire-place, F, for receiving the fuel by means of which the process is in part effected.

Figure 4:
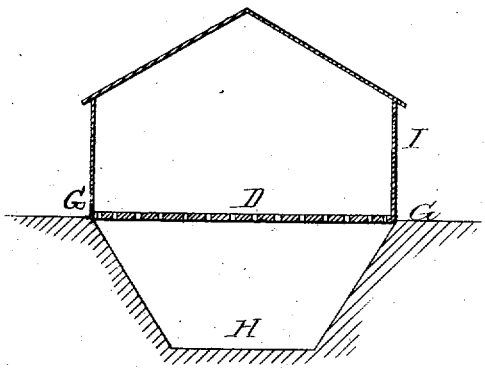

Another and more economical mode of constructing the building is that illustrated in Fig. 4, where G represents the surface of the ground, and H a trench with inclined sides, which may, if required, be simply paved or cemented; or bare ground will in some cases suffice. The grated floor or perforated platform D is in this instance on a level with the surface of the ground, and is covered by a low building, I, the roof of which, or a portion of it, is detachable.

Having deposited on the grating or floor a layer of straw or stubble, or twigs or branches of trees, a mass of animal offal from the slaughter-houses, &c., is placed on the layer and allowed to remain until the greater portion of the fluid matter is drained from it, after which the mass may be dried by simple exposure to the air.

The inventor, however, preferred artificial drying, and to employ for the purpose the direct action of the products of combustion, which cause a simultaneous drying and disinfecting. In order to do this a fire is kindled in the fire-place F, and the products of combustion permitted to pervade the whole space beneath the grated floor D. The fire is continued and the products of combustion permitted to pass through the offal, which finally becomes dry, disinfected, and ready for use as a rich manure or as a manure ingredient.

While the fire is burning, spent tan, grape-vine twigs, or other matter containing tannin, may be thrown on the fuel from time to time, for the smoke and fumes from such substances have rapid and certain disinfecting properties.

By the above-described process animal offal from the slaughters-houses can be converted into a much richer manure or manure ingredient than by the old process of drying by exposure to the air.

The offal manure obtained in the manner described may be distinguished by its solidity, the absence of worm-holes and foul odors from the air-dried offal, which is lighter, more spongy, darker colored, and much more noxious than the artificially dried and disinfected offal.

We claim as the invention of the said WILLIAM ADAMSON, and as a new product—

The within-described manure or manure ingredient, the same consisting of the within-described heavy, solid, and inodorous animal offal.

In testimony whereof we have signed our names to this specification in the presence of two subscribing witnesses.

JOHN P. BAUGH.
EDWIN P. BAUGH.
DANIEL BAUGH.

Witnesses:
C. H. TIERS,
HARRY SMITH.